Feb. 25, 1969      D. L. MARTIN ET AL      3,429,032
METHOD OF MAKING SUPERCONDUCTORS CONTAINING FLUX TRAPS
Filed June 28, 1965      Sheet 1 of 3
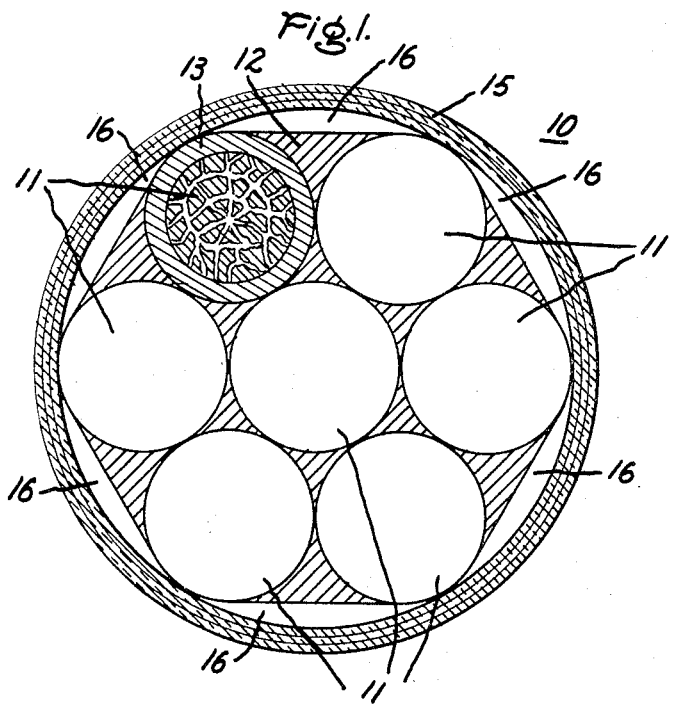
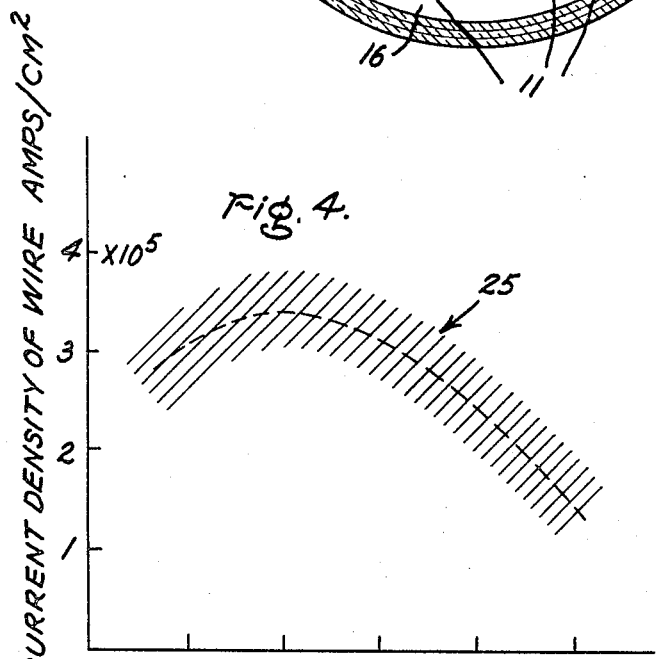
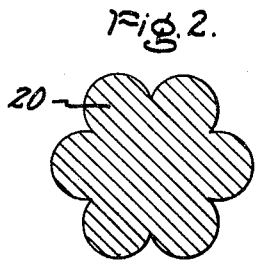
Inventors:
Donald L. Martin,
Mark G. Benz,
by Richard A. Speer
Their Attorney.

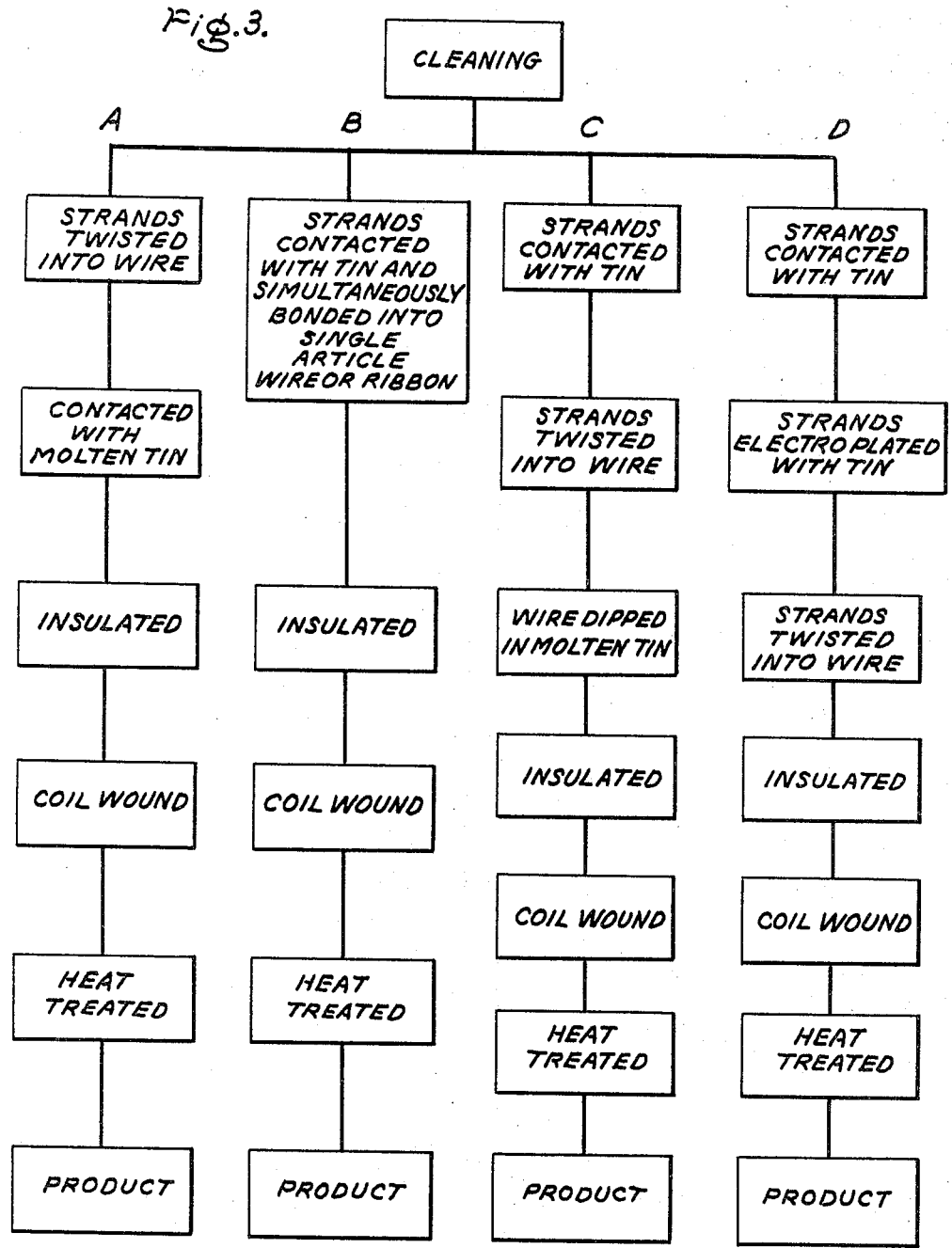

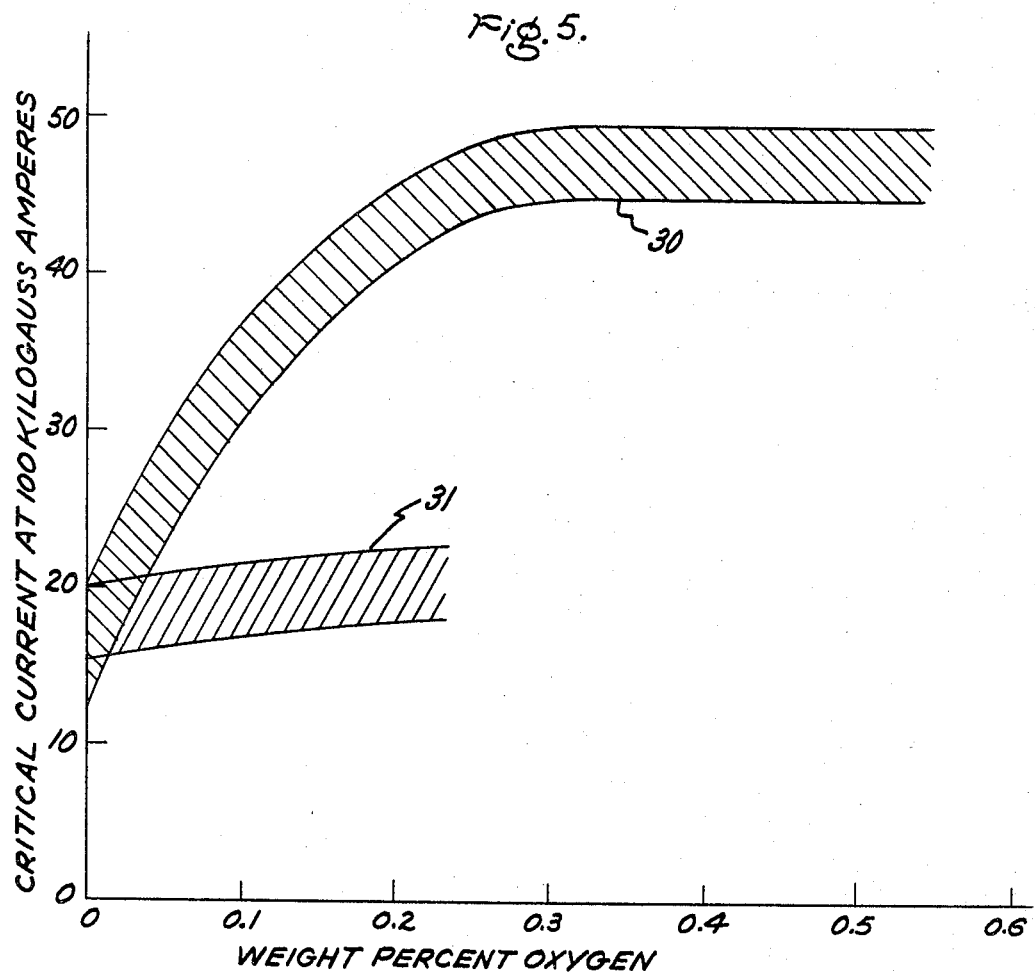

United States Patent Office 3,429,032
Patented Feb. 25, 1969

3,429,032
METHOD OF MAKING SUPERCONDUCTORS CONTAINING FLUX TRAPS
Donald L. Martin, Elnora, and Mark G. Benz, Burnt Hills, N.Y., assignors to General Electric Company, a corporation of New York
Continuation-in-part of application Ser. No. 316,269, Oct. 15, 1963. This application June 28, 1965, Ser. No. 467,577
U.S. Cl. 29—599
Int. Cl. H01b 1/02, 3/08, 13/00
10 Claims

ABSTRACT OF THE DISCLOSURE

The properties of superconductors of the niobium-tin type may be improved by the provision of flux trapping or pinning sites therein in the form of a dispersion of stable particles formed by the reaction between a metal such as zirconium, for example, and a nonmetal such as oxygen, nitrogen or carbon to form the corresponding metal oxides, nitrides or carbides. While the particle forming metal may be present as an alloying ingredient in either the tin bath through which the niobium strand is passed, or as an alloying ingredient in the niobium strand, where the superconductor is $Nb_3Sn$, it is preferred to use a niobium-zirconium alloy. In the process, a niobium-zirconium alloy strand is passed through a molten tin bath to form a tin coating thereon and subsequently heat treated in the presence of the nonmetal reactant whereby an $Nb_3Sn$ superconductive layer is formed containing the stable reaction product dispersion.

This application is a continuation-in-part of applicants' copending application Serial No. 316,269, now abandoned, filed Oct. 15, 1963, and is assigned to the same assignee.

The invention relates to superconductors and more particularly to improved superconductive bodies and to improved processes for producing such bodies.

While the existence of superconductivity in particular metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems formerly involved in extremely low temperature operations.

As is well known, "superconduction" is a term describing the type of electrical current conduction existing in certain materials cooled below a critical temperature $T_c$, where resistance to the flow of current is essentially nonexistent. A superconductive material, that is, any material having a critical temperature $T_c$, below which normal resistance to the flow of electrical current is absent, can be subjected to an applied magnetic field when cooled below $T_c$ and a current will be induced therein. The current in the superconductive material, however, even with the removal of the applied magnetic field, will theoretically continue for an infinite time and is therefore called "supercurrent" to distinguish it from the usual current present at temperatures above the critical temperature $T_c$, but supercurrents will exist in those materials classified as "soft" superconductors only if a geometry is provided which has multi-ply connected surfaces, as opposed to a simply connected surface, and the applied magnetic field is below a critical magnetic field $H_c$. A solid cylinder is an example of a simply connected body, and a cylinder having an axial bore or a hollow sphere are examples of multi-ply connected bodies. In the case of "hard" superconductors, supercurrents will exist without regard to the geometry of the body, since they are inherently multi-ply connected. Here, assuming the low temperature requirement which is present in all cases, the applied magnetic field need only be below the critical field $H_c$.

The terms "hard" and "soft," as applied to superconductors, originally referred principally to these physical properties of the materials. Subsequently, however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a subcritical magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically reversed applied magnetic field.

Soft magnetically superconductive bodies are, by way of comparison, composed of materials which are not inherently magnetically hard and which have only a simply connected surface. If a soft superconductive material is shaped in solid cylindrical form, the superconductive body is soft. If, on the other hand, the same soft material is shaped into hollow cylindrical form, the resulting superconductive body may be classified as hard, since it will trap flux.

The discussion thus far has omitted any reference to another factor which is to some degree responsible for the lack of use of superconductive bodies where the trapped magnetic flux is the element sought. This factor is the amount of supercurrent and contemporaneous trapped magnetic flux which can be obtained. The applied magnetic field to which a superconductive body is subjected begins to penetrate the skin or surface of the body and immediately creates a supercurrent which precludes the further penetration of the body. This is known as the Meissner effect. The depth of flux penetration that was felt to be possible in view of the Meissner effect was increased somewhat by the development of a theory by F. and H. London which states that the degree of flux penetration is a factor of the current density. The London theory envisioned current densities in a gross superconductor which decreased in magnitude from the outside toward the inside of the body. The result has been that the flux penetration depth of a given superconductive material is given in terms of the London penetration depth $\lambda$. However, since the penetration depth $\lambda$ is exceedingly small for example, less than about 1000 A. in the best materials, it has not been possible to improve the quantity of trapped flux in gross superconductive bodies. An increase in the magnitude of the applied magnetic field does not extend the limit, since this limit is fixed at the critical field $H_c$, which results in the creation of a critical current $I_c$ in the surface of the superconductor and drives it normally resistive, or non-superconducting.

It has been found that hard superconductive bodies possess higher critical fields $H_c$ than soft superconductive bodies and available evidence increasingly supports the proposition that the higher critical fields, and therefore higher current densities, are manifestations of the microstructure in hard superconductive bodies. Specifically, the magnetic properties of high critical field superconductors are felt to inhere from what may be described as a fine filamentary mesh which pervades the bodies. Such a mesh provides connectivity that has an extremely high multiplicity. Since the filaments are thinner than the penetration depths of a gross superconductive body, they will remain superconductive in the presence of externally applied magnetic fields which exceed the critical field of the gross superconductive body. This fact, also raises the critical current density $J_c$ and enables larger currents to flow losslessly in the bodies.

It is now believed that flux penetration in high critical field bodies differs from that for gross or bulk superconductors in that such penetration increases with a decrease in superconductors thickness or diameter. This relationship is indicated by the expression:

$$\lambda = \lambda_L \left(\frac{E_0}{D}\right)^{1/2}$$

where $\lambda$ is the penetration depth,
$\lambda_L$ is the London penetration depth,
$E_0$ is the coherence distance which ranges from about 1000 A. to 10,000 A., and
D is the thickness of the superconductive filament.

The striking result of this general concept is that the magnetization of a filamentary superconductor depends upon macroscopic dimensions of the sample, this being a feature that was heretofore contraindicated.

With this background, the nature of the present invention and the surprising discoveries upon which it is predicated, may be more fully comprehended and appreciated by those skilled in the art. In accordance with this invention, superconductors can be produced readily and economically by a process which yields consistently high quality products. Further, superconductors having uniquely high current-carrying capacity can be made in the forms and sizes desired and this can be done using materials meeting the economic and engineering requirements of the manufacturer.

It is known that selected metals, either pure or preferably containing minor alloying additions, are capable of being reacted with other metals and forming superconductors of high current carrying capacity. Specifically, the metals niobium, tantalum, technetium, and vanadium can be reacted or alloyed with tin, aluminum, silicon or gallium to form superconducting compounds or alloys, such as $Nb_3Sn$, which have high current carrying properties. Additionally, it is currently understood that these alloys or compounds can be improved by first alloying the basic or parent metal, i.e., niobium, tantalum, technetium or vanadium with a minor amount of a solute metal having an atom diameter at least 0.29 A. larger than the diameter of the parent metal atom. A complete disclosure and description of various parent metals, solute metals and reactant metals can be found in the copending application of Warren De Sorbo, Ser. No. 237,158, filed Nov. 13, 1962, entitled "Superconducting Materials with High Current-Carrying Capacities and High Critical Field Values," assigned to the same assignee as the present invention and incorporated in the present application by reference.

Of the materials mentioned above, it has been found that niobium constitutes an extremely valuable parent metal due to the superior superconducting alloys which it will form. For example, small percentages, generally greater than one-tenth weight percent, of a solute metal can be added to niobium parent metal to effectively increase its current-carrying capacity. Zirconium additions are felt to be those most advantageous. The solute materials, for example zirconium, are added in amounts ranging from about 0.1 weight percent up to an amount equivalent to the ratio represented by the formula $Nb_2Zr$. The other additives are used in similar amounts. The solute-bearing niobium is reacted with either tin or aluminum by contracting the niobium with either of the two metals in the vapor or liquid states. The particular details and operating conditions of how vapor deposition and reaction or liquid contact and reaction of tin or aluminum with niobium is carried out can be found in the copending application of Warren De Sorbo, entitled "Magnetic Bodies and Method," Ser. No. 149,590, filed Nov. 2, 1961, assigned to the same assignee as the present invention and incorporated herein by reference.

It has for some time also been recognized that niobium-tin compositions in which the ratio of niobium to tin approximates three to one, i.e., $Nb_3Sn$, have superior superconducting properties. Consequently, this alloy has been fabricated in various forms, principally wires, in efforts to produce devices such as high field superconducting electromagnets. One of the best methods for obtaining superconducting wire in a continuous and economical fashion is that wherein a wire of a preselected parent metal, advantageously niobium or niobium alloy, is continuously led through a bath of molten metal capable of combining with the parent metal and forming a superconducting alloy. For example, in the copending application of D. L. Martin and D. H. Wilkins, entitled "Method of Making Superconducting Wire," Ser. No. 255,474, filed Feb. 1, 1963, assigned to the same assignee as the present invention and incorporated by reference into the present application, it is taught that niobium and niobium alloyed with solute metals can be run through a molten bath of tin or equivalent metal and then heat treated to form desirable superconductive alloys or compounds.

In the case of niobium-tin alloys, the niobium is run through molten tin which is at a temperature of 650° C. to 1300° C., preferably 850° C. to 1100° C., to accrete a layer of tin thereon. This composite is then heat treated at a temperature of from about 900° C. to 1000° C. to form the superconducting compound, viz., $Nb_3Sn$.

The present applicants have now found, suprisingly, that the maximum electrical current which a superconductor wire can carry without going normal, that is, while remaining superconductive, is significantly increased if a surplus of tin or other reactant metal is present on the wire. Unfortunately, efforts to place excess quantities of reactant metal on the wire have been at times disappointing due to the unanticipated problems such as "beading" which severely limits the usefulness of the superconducting wire. Beading is the presence of beads or drops on the surface of the wire and essentially negates the potential usefulness of the wire by precluding its use in the production of coils due to the inability to eliminate electrical shorts between turns of the coil. Further, it has been unexpectedly found that superconductors having a dissolved solute addition can have their current carrying capacities significantly increased by subjecting them to a processing schedule causing the formation of a precipitated second phase.

It is a principal object of this invention to provide as an article of manufacture a new and novel superconductive wire having improved electrical current carrying capacities over wires known in the past.

Another object of this invention is to provide superconductive wires having an excess of reactant metal improving the electrical current carrying capacity of the wire and which is capable of being produced in a rapid, and more economical manner.

A further object of this invention is to provide superconductive wires having a precipitated phase improving the current carrying capacity and to provide a process for producing such wires.

Other objects and advantages of this invention will be in part obvious and in part explained by reference to the accompanying specification and drawings.

In the drawings:

FIG. 1 is an enlarged cross-sectional view of a superconductive wire having superior current carrying capacity according to this invention;

FIG. 2 is a cross-sectional view of a strand showing a different physical configuration;

FIG. 3 is a generalized flow diagram showing different manners in which the novel superconductive wire of this invention may be produced;

FIG. 4 is a graph showing the current carrying capacity of superconductive wire according to this invention as a function of size; and FIG. 5 is a graph showing the relationship of oxygen content to critical current in the material of the invention.

Very generally, the wire with which this invention concerns itself is one having large, exposed surface areas and one preferably comprised of a plurality of individual, continuous strands composed of metal capable of combining with a second, or reactant metal, and forming a superconductive alloy or compound. The second metal has a melting point lower than the parent or matrix metal to facilitate processing, as is explained later in more detail.

Discussing the novel, superconducting wires of this invention in more detail, it was earlier indicated that many different metals were efficacious as parent or base materials. Specifically, niobium, tantalum, technetium or vanadium are valuable base metals and these can be used either as pure meals or preferably can be alloyed with the solute materials mentioned previously to improve the ultimate current carrying capacity of the resulting wires. The base metal or alloy is then reacted with one of the metals from the group of tin, aluminum, silicon or gallium to form the superconducting compound. The present inventors have unexpectedly discovered two factors having direct bearing on the current-carrying capacities of superconductive wires. The first of these is that greatly increased current carrying capacity can be obtained by so constructing the wire that amounts of reactant metal above those previously used with the base metal are present. The second fact discovered is that a wire size effect is present which enables the passage of larger current density if the individual strands making up a wire do not exceed about 5 mils in diameter and preferably fall within the range of from about 1 to 5 mils.

An enlarged, and somewhat schematic showing of a wire according to this invention is shown in FIG. 1 of the drawings in which the numeral 10 indicates the wire generally. It will be noted that the wire is constructed of a plurality of individual strands 11 which, although not shown, are long continuous lengths. The strands 11 are made of one of the base or parent metals set forth earlier. Surrounding or enclosing strands 11 is a reactant metal 12, which may be any one of those listed previously. The reactant metal combines with the base metal, after suitable heat treatment, to form a superconductive compound or alloy 13 which surrounds each of the individual strands 11 and tends to replace the reactant metal 12. The amount or thickness of superconductive compound 13 present on the surface of strands 11 will to a large extent depend upon the length of time the wire is heat treated after the parent and reactant metals have been brought together.

From FIG. 1 is can be seen that the reaction takes place at the surface of strands 11 and progresses inwardly. Since the wire 10 will be of use in constructing electromagnetic devices and will in most instances be coiled or wound, it is electrically insulated by enclosing it in a suitable electrically insulating material 15. This layer 15 prevents shorting between adjacent turns of the wire. Generally speaking, any of the known insulating materials may be used, depending upon the precise manner in which the wire is to be used, although this generality is subject to an exception mentioned later. For example, it has been found that if the wire is to be wound into a coil before heat treating to form the superconducting compound, a temperature resistant insulation such as quartz glass yarn can be wound around it with good results. On the other hand, if heat treatment is effected prior to insulation, then comparatively low temperature organic or inorganic insulation materials are suitable.

Surprisingly, it has been found that an insulating substance that gives up oxygen at the temperatures at which the wire is reacted will assure obtention of maximum electrical and magnetic properties from the wire. For example, a quartz glass yarn insulation which is treated with a hydrated phosphate, for example hydrated aluminum phosphate, prior to heat treatment of the wire supplies oxygen which possibly reacts with the solute metals in the parent or base metal and forms a particle dispersion that functions as a flux trap. Flux trapping enables the wire to carry greater electrical currents than would otherwise be possible. It is also possible to heat treat the uninsulated wire in an atmosphere containing a small but effective amount of oxygen to obtain the desired reaction.

The following table shows the critical current carried by straight wires composed of a niobium-one percent zirconium alloy and structurally consisting of 7 twisted strands each of 3-mil diameter.

Table I

| Critical current at 30 kg., amps: | Type of insulation |
|---|---|
| 70 | Quartz glass yarn. |
| 170 | Quartz glass yarn and aluminum phosphate. |

From this table it can be seen readily that the use of a substance supplying some oxygen significantly improves the critical current-carrying capacity of the superconductive wire.

The advantageous effect of oxygen can also be seen by reference to FIG. 5 of the drawing which, in addition, illustrates the amounts of oxygen that are preferred. Curve 30 indicates the results obtained from testing wire samples made up of seven strands of 0.003 mil diameter which were subjected to a water-saturated argon atmosphere for 20 seconds at 1000° C. The argon was saturated with water vapor by bubbling it through water at room temperature. Upon contact with the atmosphere, an oxygen-rich layer is created on the outer surface of the wire and this oxygen then subsequently diffuses into the wire to react with the solute metal and form a dispersed phase. The wire was niobium containing 1 percent zirconium and had been dipped in tin prior to being subjected to the wet argon atmosphere. From curve 30 it will readily be seen that quantities of oxygen ranging from about 0.1 to 0.4 are beneficial in raising the critical current density of the wire. Greater amounts of oxygen are contraindicated due to deteriorating physical properties, specifically embrittlement, which renders the wire too difficult to handle without undue fracture.

The temperature and time of exposure of the wire to oxygen is dependent upon the partial pressure of oxygen present. For example, instead of using a water saturated atmosphere such as argon, a pure oxygen atmosphere could be used and in this case the proper amount of oxygen put on the wire by 15–20 seconds' exposure at only 400° C.

The effect of oxygen on niobium wire containing no addition of zirconium or other solute metal is shown by curve 31 to be negligible, since no second phase particles are formed to act as flux-pinning sites.

It will be appreciated that nonmetallic substances other than oxygen can be used to combine with the solute metal to form a second phase. Specifically, materials such as nitrogen and carbon are also effective. A niobium tape ½ inch wide by 0.0003 inch thick and containing 1 percent dissolved zirconium was subjected to a nitrogen atmosphere, following dipping in tin, for a time sufficient to place 0.1 percent nitrogen in the strip. A piece of the strip which was not nitrided had a critical current density of 50 amps, whereas a similar strip which was nitrided had a critical current density of 200 amps.

The assembly of a plurality of strands 11 enables attainment of the presence of a large quantity of reactant metal 12 in the wire 10. As shown in FIG. 1, the spaces between the strands 11 are filled with reactant metal so that an excess quantity is present. Applicants have determined that wires constructed of 7 strands, or multiples thereof, make the most efficient use of the space between the individual strands, a use factor of 78 percent being achieved in the case of a 7-strand wire and slightly lower factors being obtained for multiples of 7-strand wire. The next most efficient use of space is in a wire constructed of 19 strands, the use factor in this instance being 76 percent.

It was indicated previously that the diameter of the individual strands was a relevant parameter affecting the current density which a given wire is capable of carrying while remaining superconductive. FIG. 4 of the drawings clearly illustrates the effect of strand diameter size on current capacity. Curve 25 shows the critical current density, that is the density at which the wire becomes normally conductive, for a wire constructed of 7 strands. It is apparent that the critical current density decreases as the wire diameter becomes smaller than about 2 to 2.5 mils and further becomes so small when the diameter becomes larger than about 5 mils that it is of limited practical value. Curve 25 represents average values taken from many samples so that it should be understood that critical current density values for any sample of specific diameter might be either above or below the values indicated by the curves.

During heat treatment the reactant metal will expand more than the base metal and when this occurs in a coil-wound wire, it is possible for turns of the coil to become shorted as the result of metal breaking through the insulation between turns. We have found that this difficulty can be overcome or alleviated by twisting the strands 11 of wire 10 together in such a way that the outer surface of the wire defines spiral flutes. When the spiral-fluted wire is wrapped with insulation, such as quartz glass yarn 15, spaces 16 are left which provide space into which reactant metal can expand. Thus, the probability of electrical short circuits developing is significantly reduced.

Since extra quantities of reactant metal are highly desired, the exposed surfaces of the individual strands can be increased, as by fluting the outer surface, so that more reactant metal can be held. For example, the strand could be drawn through a die which would form the outer surface into a configuration giving larger surface areas than would be present in a strand of circular cross-section. FIG. 2 illustrates a typical surface configuration on a strand 20 which introduces additional area for contact with reactant metal.

Turning now to a discussion of some of the various processes by which wire according to the invention can be produced, FIG. 3 of the drawings outlines the broad, general steps of four different ways in which the parent or base metal can be contacted with a reactant metal to form a superconductive wire. Of the four processes outlined (A, B, C, D), the first or A process is that which is preferred. At this point, it should be recognized that many of the steps of the four processes are similar and, further, that processes similar to those outlined in the figure of the drawings will readily suggest themselves and are included within the scope of this invention.

Discussing the preferred or A process first, individual strands made of one of the parent metals discussed earlier, here shown as niobium, are prepared to have a diameter falling within the range of from about 1 to 5 mils. These strands are cleaned in a hydrofluoric-nitric acid solution (10 percent) and then twisted into a stranded wire, preferably composed of 7 strands, so that the outer surface of the wire is in the form of a spiral flute. The twisted wire is then brought into contact with molten tin (or other reactant metal) by continuously running it through a bath of tin which has been raised above the melting temperature. This operation, of course, fills the interstices of the wire with tin and also completely surrounds the outer periphery of the wire. This operation permits a large amount of excess tin to be placed on the wire and thereby raises the critical current capacity of the resulting product. The next step in the process is that of insulating the tin-dipped wire and this may be accomplished by covering it with a high temperature inorganic substance such as quartz glass yarn fiber or by coating the surface with a fluidized insulation which carries silica powder or the like and which preferably includes an oxygen-supplying substance such as hydrated aluminum phosphate. The resulting insulated wire is then wound into coil form or other desired shape and heat treated at from 900 to 950° C. to react the tin with the parent metal and form the superconducting compound. In the case of a niobium parent metal and tin as the reactant metal, the superconducting compound is $Nb_3Sn$.

Process B differs from process A just described in that the individual strands are contacted with tin and simultaneously bonded into a single wire. This step contemplates, for example, the passing of individual strands into a bundle in which the axes of the individual strands are parallel and then bonding the strands together by surrounding them with a frozen matrix of reactant metal. The process is otherwise the same in terms of operational steps, heat treating temperatures, etc., as process A.

Process C is slightly different in that after the cleaning step the strands are individually contacted with tin by any suitable means so that each is completely enclosed within a layer of tin, or other reactant metal. The strands are then twisted into a wire so that the wire has a spirally fluted surface and this wire then dipped in molten tin to fill any voids which may have remained and to insure the presence of an excess quantity of reactant metal. The product wire is then insulated and coil-wound and heat treated to produce the final product.

The final process outlined is that shown in column D wherein the strands after cleaning are contacted with tin as in process C, and then are electroplated with additional tin so that each strand carries an excess quantity assisting the development of large current-carrying capacities. These strands are then twisted into wire, the wire insulated and heat treated to form the final superconductivity product. It will be appreciated that insulation, as previously mentioned, can be effected prior to heat treatment of the wire or can be effected after heat treatment thereof. In the case where heat treatment is performed prior to insulation, handling of the wire is somewhat reduced due to the more brittle nature of the superconductivity products formed. However, the material remains sufficiently flexible to allow its shaping into coils only slightly larger than those produced from un-heat-treated wire.

In all of the processes outlined above, the wire can be advantageously reacted with oxygen in one of the manners previously described to increase the current carrying capacity of the wire. Such reaction would be effected after the base metal has been coated with tin and before any further processing steps are undertaken.

The following Table II indicates the critical currents of wires produced according to processes A, C and D just discussed, each cable consisting of 7 strands of 3-mil diameter and heat treated for 4 hours at 950° C. in argon to produce the superconducting compound.

*Table II*

| Process: | Critical current at 30 kg. at 4.2° K. |
|---|---|
| A | 80–170 |
| C | 80–170 |
| D | 80–170 |

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What we claim as new and desire to secure by Letters Patent of the United States is:

1. The method of producing superconductive wire comprising contacting a body of niobium containing zirconium in an amount up to about 25 percent with molten tin at a temperature in the range of from about 800° C. to 1100° C. until an adherent deposit is formed on said body, insulating the tin carrying body with an electrically insulating material which is thermally stable up to about 975° C., and heat treating the insulated wire at temperatures of from about 900° to 950° C. in the presence of a nonmetal selected from the group consisting of oxygen, carbon and nitrogen to react the tin with said niobium body and form a niobium-tin superconductive alloy containing a dispersion of stable particles composed of the reaction product of said zirconium and said nonmetal.

2. A process for producing a superconductive coil comprising, contacting a niobium-base wire containing zirconium in an amount up to 25 percent constructed of a plurality of strands with molten tin at a temperature in the range of from about 800° C. to 1100° C. until an adherent deposit is formed thereon, insulating the tin carrying wire with an electrically insulating material which is thermally stable up to about 975° C., winding said insulated wire into a coil, and heat treating the coil at a temperature of from about 900° C. to 950° C. in the presence of a nonmetal selected from the group consisting of oxygen, carbon and nitrogen to react the tin with said niobium-base wire and form a niobium-tin superconductive alloy containing a dispersion of stable particles composed of the reaction product of said zirconium and said nonmetal.

3. A process for producing a superconductive coil comprising, twisting a plurality of individual strands composed principally of niobium containing zirconium up to about 25 percent together forming a wire having a spirally fluted outer surface, contacting the wire with molten tin at a temperature in the range of from about 800° C. to 1100° C. until an adherent deposit is formed thereon, insulating the tin carrying wire with an electrically insulating material which is thermally stable up to about 975° C., winding said insulated wire into a coil, and heat treating the coil at a temperature of from about 900° C. to 950° C. in the presence of a nonmetal selected from the group consisting of oxygen, carbon and nitrogen to react the tin with the niobium-base wire and form a niobium-tin superconductive alloy containing a dispersion of stable particles composed of the reaction product of said zirconium and said nonmetal.

4. A process for producing a superconductive wire comprising, contacting a niobium-base wire containing zirconium in an amount up to 25 percent with molten tin at a temperature of from about 800° C. to 1100° C. until an adherent deposit is formed thereon, heat treating the wire at temperatures of from about 900° C. to 1100° C. in the presence of a nonmetal selected from the group consisting of oxygen, carbon and nitrogen to react the tin with the niobium-base wire and form a niobium-tin superconductive compound containing a dispersion of stable particles composed of the reaction product of said zirconium and said nonmetal, and insulating the reacted wire with an electrically insulating material.

5. A process for producing a superconductive coil comprising, contacting a niobium-base wire containing zirconium in an amount up to 25 percent constructed of a plurality of strands with molten tin at a temperature in the range of from about 800° C. to 1100° C. until an adherent deposit is formed thereon, tinning individual wire strands composed principally of niobium, twisting a plurality of said tinned strands together forming a wire having a spirally fluted outer surface, contacting said twisted wire with molten tin at a temperature in the range of from about 800° C. to 1100° C. until an adherent deposit is formed thereon, insulating the wire with an electrically insulating material which is thermally stable up to about 975° C., forming a coil from said insulated wire and heat treating the insulated wire coil at a temperature of from about 900° C. to 950° C. in the presence of a nonmetal selected from the group consisting of oxygen, carbon and nitrogen to react the tin with the niobium-base wire and form a niobium-tin superconductive alloy containing a dispersion of stable particles composed of the reaction product of said zirconium and said nonmetal.

6. The method of producing superconductive wire comprising contacting a body of niobium containing a small but effective amount up to 25 percent dissolved zirconium with molten tin at a temperature in the range of from about 800° C. to 1100° C. until an adherent coating is formed on said body, contacting the tin coated niobium body with a nonmetal selected from the group consisting of oxygen, carbon and nitrogen for a time sufficient to create a layer rich in the nonmetallic on the outer surface of the body, and heat treating the body at a temperature of from about 900° C. to 950° C. to react the tin with the niobium and to diffuse and react the selected nonmetallic with the zirconium dissolved in the niobium.

7. The method of producing superconductive wire as described in claim 6 wherein the selected nonmetal is oxygen.

8. The method of producing superconductive wire as described in claim 6 wherein the selected nonmetal is nitrogen.

9. The method of producing superconductive wire as described in claim 6 wherein the selected nonmetal is carbon.

10. The method of producing superconductive wire comprising contacting a body of niobium containing a small but effective amount up to about 25 percent dissolved zirconium with molten tin at a temperature in the range of from about 800° C. to 1100° C. until an adherent coating is formed on said body, contacting the tin-coated niobium body with oxygen at a temperature and for a time sufficient to place from about 0.1 to 0.4 percent oxygen in the body, insulating the body with an electrically insulating material which is thermally stable up to about 975° C., and heat treating the insulated wire at a temperature of from about 900° C. to 950° C. to react the tin with the niobium and to diffuse and react the oxygen with the dissolved zirconium.

References Cited

UNITED STATES PATENTS

| 3,181,936 | 5/1965 | Denny et al. | 29—194 |
| 3,218,693 | 11/1965 | Allen et al. | 29—599 |
| 3,243,871 | 5/1966 | Saur | 29—599 |
| 3,262,187 | 7/1966 | Allen et al. | 29—599 |
| 3,270,400 | 9/1966 | Saur | 29—599 |
| 3,277,564 | 10/1966 | Webber et al. | 29—599 |
| 3,296,684 | 1/1967 | Allen et al. | 29—599 |
| 3,358,361 | 12/1967 | Kolbe | 29—599 |

JOHN F. CAMPBELL, Primary Examiner.

PAUL M. COHEN, Assistant Examiner.

U.S. Cl. X.R.

29—194, 527